(12) United States Patent
Bergland et al.

(10) Patent No.: US 10,255,655 B1
(45) Date of Patent: Apr. 9, 2019

(54) SERIAL PIXEL PROCESSING WITH STORAGE FOR OVERLAPPING TEXEL DATA

(71) Applicant: Apple Inc., Cupertino, CA (US)

(72) Inventors: Tyson J. Bergland, San Francisco, CA (US); Abdulkadir U. Diril, Mountain View, CA (US); Anthony P. Delaurier, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/625,723

(22) Filed: Jun. 16, 2017

(51) Int. Cl.
  G06T 1/60 (2006.01)
  G06T 1/20 (2006.01)
  G06T 11/00 (2006.01)
  G06F 17/50 (2006.01)

(52) U.S. Cl.
  CPC ............ *G06T 1/20* (2013.01); *G06F 17/5045* (2013.01); *G06T 1/60* (2013.01); *G06T 11/001* (2013.01); *G06F 2217/12* (2013.01); *G06T 2210/52* (2013.01)

(58) Field of Classification Search
  CPC . G06T 1/20; G06T 11/001; G06T 1/60; G06T 2210/52
  See application file for complete search history.

(56) References Cited

U.S. PATENT DOCUMENTS

| 6,040,837 | A | 3/2000 | Wong et al. |
| 7,167,183 | B1 | 1/2007 | Donovan et al. |
| 7,456,846 | B1 | 11/2008 | King et al. |
| 7,834,873 | B2 | 11/2010 | Kurupati |
| 7,884,831 | B2 | 2/2011 | Minkin et al. |
| 8,836,813 | B2 * | 9/2014 | Hatano ................. H04N 9/045 348/222.1 |
| 9,007,389 | B1 | 4/2015 | Heckbert |
| 9,619,898 | B2 | 4/2017 | Chatterjee et al. |
| 2015/0138228 | A1 | 5/2015 | Lum et al. |
| 2016/0078666 | A1 | 3/2016 | Park et al. |
| 2016/0368293 | A1 | 12/2016 | Shimada |
| 2017/0032543 | A1 | 2/2017 | Cho et al. |
| 2017/0061671 | A1 | 3/2017 | Cerny |
| 2017/0103565 | A1 | 4/2017 | Jeong et al. |

* cited by examiner

*Primary Examiner* — Antonio A Caschera
(74) *Attorney, Agent, or Firm* — Meyertons, Hood, Kivlin, Kowert & Goetzel, P.C.

(57) ABSTRACT

Techniques relating to serial processing of pixels in a texture processing pipeline. In some embodiments, the pipeline receives pixel data for a set of pixels in parallel but processes the pixels in the set serially in a pipelined fashion. In some embodiments, the pipeline includes a stage configured to retain texel data for use by a subsequently processed pixel. They may allow overlapping texels to be fetched once for the set of pixels rather than multiple times for different pixels in the set. In some embodiments, the pipeline uses a selected ordering of serial processing for the pixels, where the ordering increases the potential for texel overlap, relative to one or more other orderings.

20 Claims, 10 Drawing Sheets

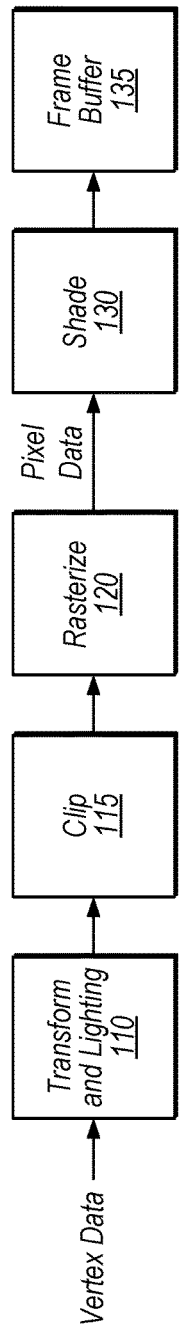
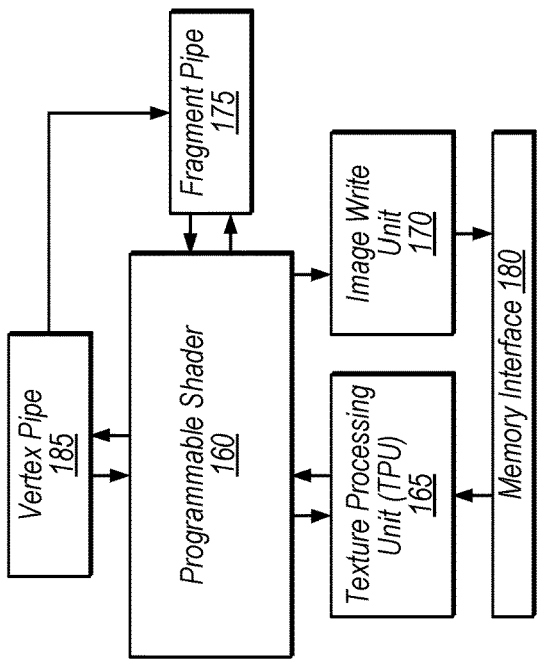
FIG. 1A
FIG. 1B

*If anisotropic major axis is horizontal, walk the pixels in one of the following orders*

*If anisotropic major axis is vertical, walk the pixels in one of the following orders*

SERIAL PIXEL PROCESSING WITH STORAGE FOR OVERLAPPING TEXEL DATA

The present application is related to U.S. patent application Ser. No. 15/625,658, filed Jun. 16, 2017 and titled "Pixel Ordering based on Filter Mode for Serial Texture Processing."

BACKGROUND

Technical Field

This disclosure relates generally to graphics processors and more specifically to texture processing.

Description of the Related Art

Graphics processing often involves executing the same instruction in parallel for different graphics elements (e.g., pixels or vertices). Further, the same group of graphics instructions is often executed multiple times (e.g., to perform a particular function for different graphics elements or for the same graphics elements at different times). Graphics processors (GPUs) are often included in mobile devices such as cellular phones, wearable devices, etc., where power consumption and processor area are important design concerns.

Conventional GPUs typically operate on multiple pixels in parallel (often a 2×2 "quad" of pixels). In a texture processing pipeline, if four texels are sampled for each pixel in a quad (e.g., for bilinear filtering), then 16 texels are fetched for processing a quad in parallel. Is has been observed under example processing loads that typically on average, however, only 9 of those 16 texels are unique. In this case, 7 texels are being read and computed unnecessarily. This may affect performance and/or power consumption. Further, when pixels in a quad are invalid (e.g., at a primitive edge) they may still take up pipeline space, which may affect overall GPU performance.

SUMMARY

Techniques are disclosed relating to serial processing of pixels in a texture processing pipeline. In some embodiments, the pipeline receives pixel data for a set of pixels in parallel but processes the pixels in the set serially in a pipelined fashion. In some embodiments, the pipeline includes a stage configured to store texel data for use by a subsequently processed pixel. They may allow overlapping texels to be fetched once for the set of pixels rather than multiple times for different pixels in the set.

In some embodiments, the pipeline uses a selected ordering of serial processing for the pixels, where the ordering increases the potential for texel overlap, relative to one or more other orderings. In some embodiments, the order in which sets of pixels (e.g., quads) are sent to a given pipeline is controlled to further increase texel overlap. In some embodiments, the ordering of processing pixels serially is selected based on a filtering mode.

In various embodiments, the disclosed techniques may improve spatial locality of texture memory accesses, increase cache hits, reduce power consumption in accessing textures, and/or improve graphics performance.

BRIEF DESCRIPTION OF THE DRAWINGS

FIG. 1A is a block diagram illustrating an exemplary graphics processing flow.

FIG. 1B is a block diagram illustrating one embodiment of a graphics unit.

Figure 2:
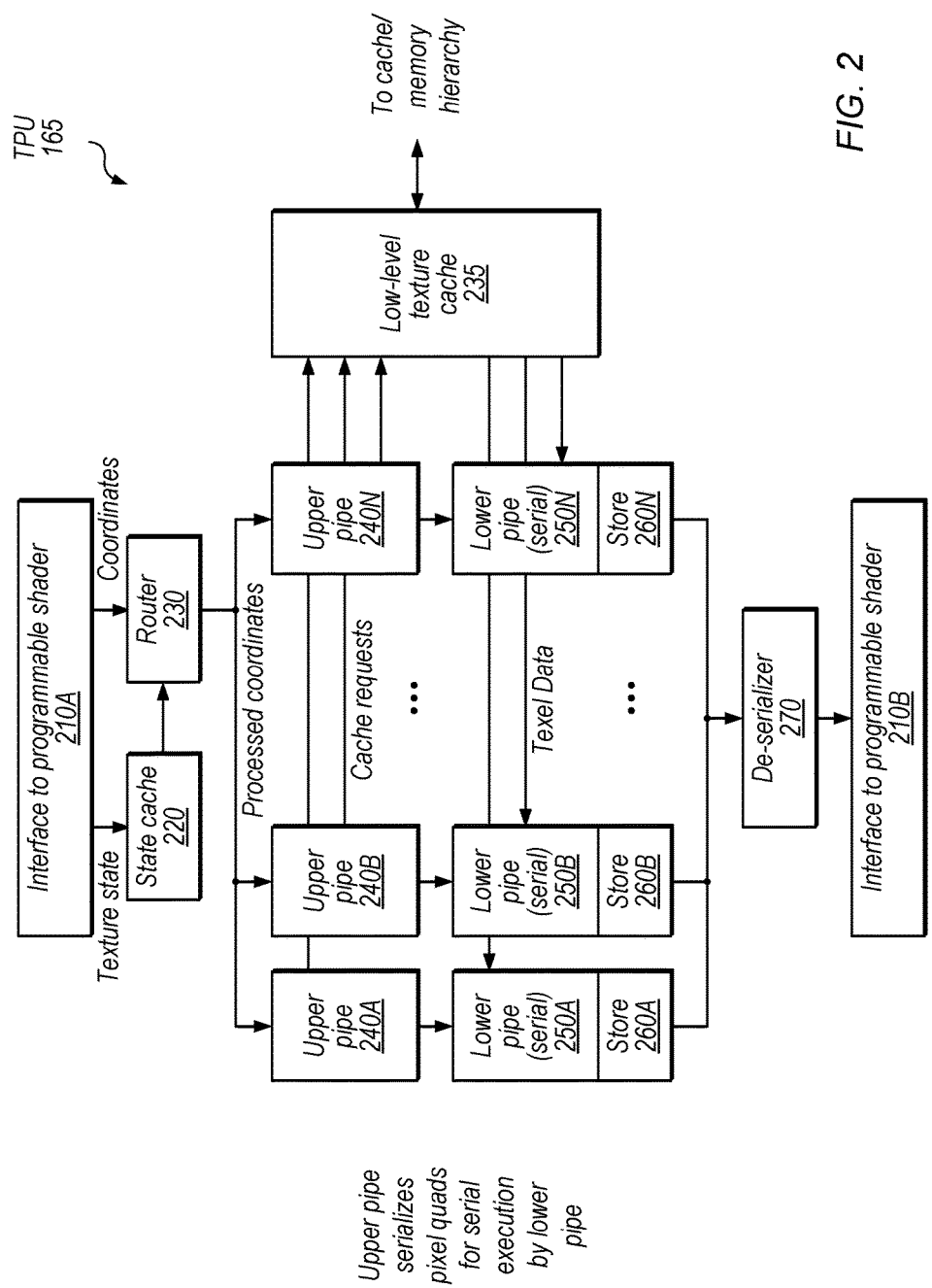
FIG. 2 is a block diagram illustrating an exemplary texture processing unit, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 6:
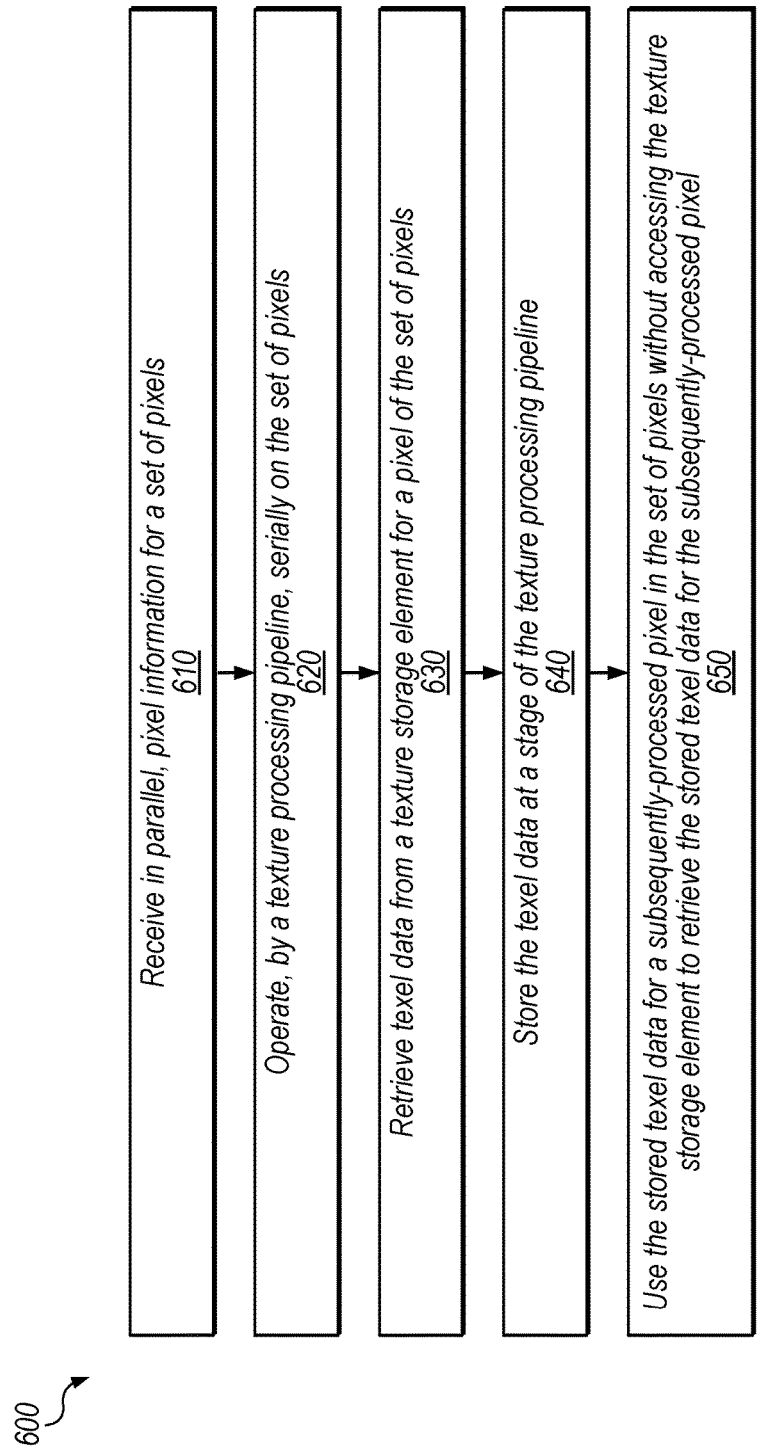
FIG. 6 is a flow diagram illustrating an exemplary method for using overlapping texels between serially processed pixels, according to some embodiments.
Figure 7:
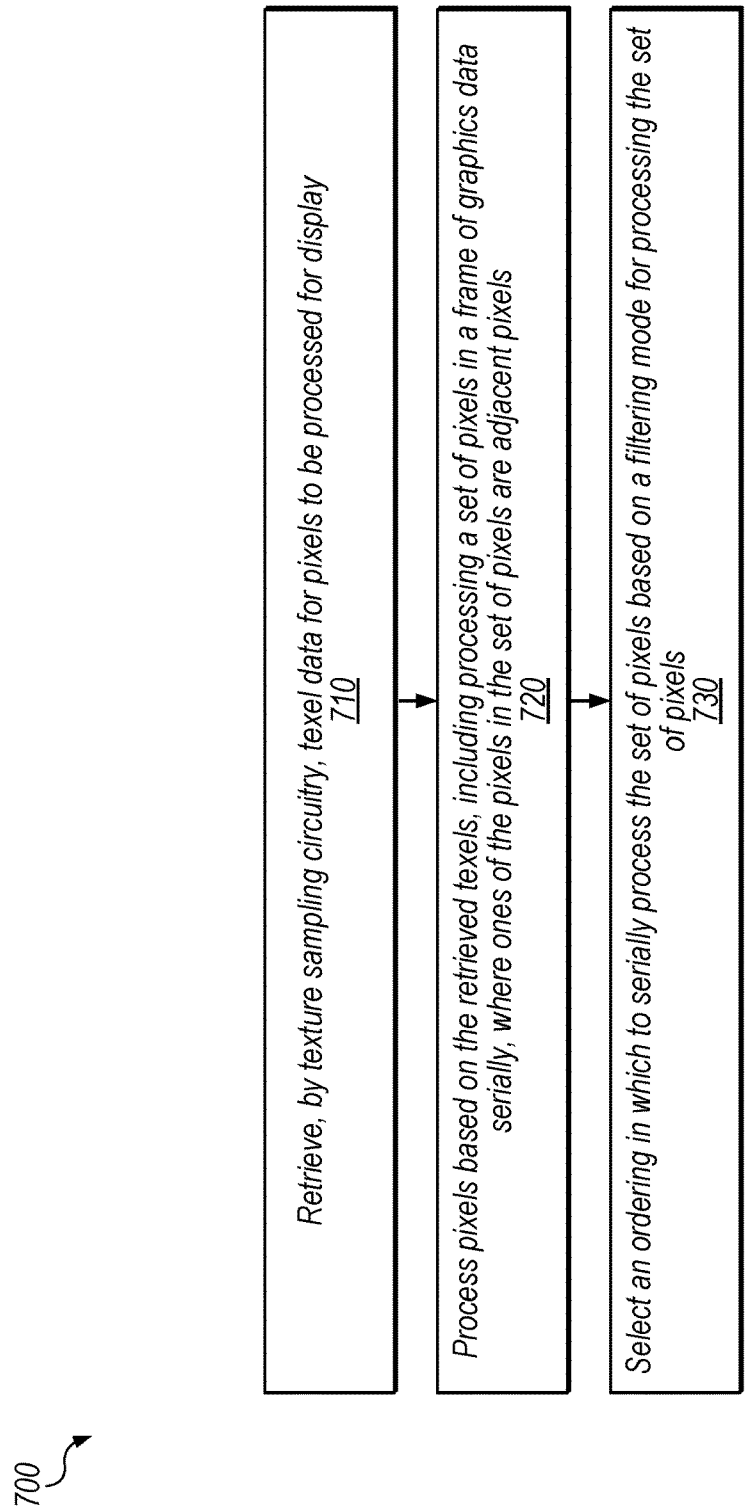
FIG. 7 is a flow diagram illustrating an exemplary method for selecting the ordering in which to serially process pixels in a set, according to some embodiments.
Figure 8:
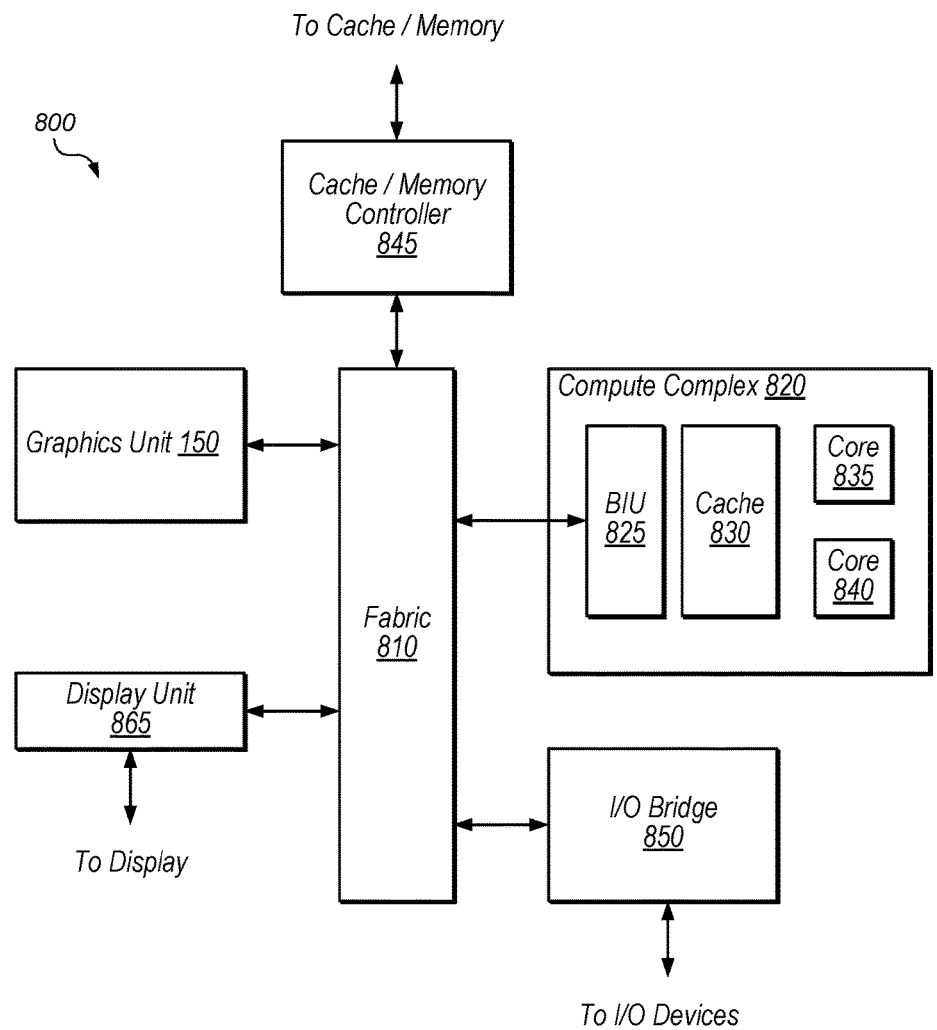
FIG. 8 is a block diagram illustrating one embodiment of a device that includes a graphics unit.
Figure 9:
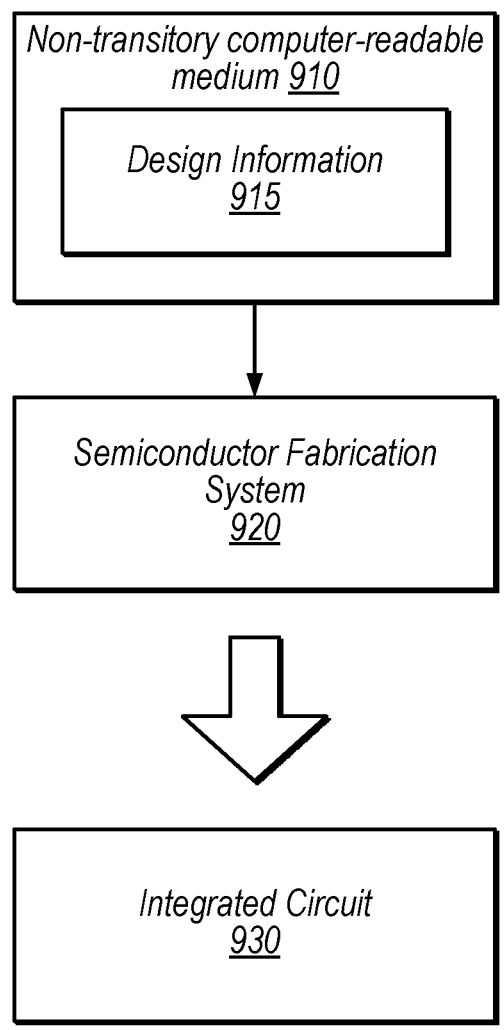
FIG. 9 is a block diagram illustrating an exemplary computer-readable medium, according to some embodiments.

This disclosure initially describes, with reference to FIGS. 1A-1B, an overview of a graphics processing flow and an exemplary graphics unit. An exemplary serial texture processing pipeline and serial pixel ordering techniques are discussed with reference to FIGS. 2-3. Exemplary ordering techniques for anisotropic filtering are discussed with reference to FIGS. 4A-4B. Exemplary ordering techniques for adjacent quads are discussed with reference to FIG. 5. FIG. 6-7 illustrate exemplary methods, FIG. 8 illustrates an exemplary device, and FIG. 9 illustrates an exemplary computer-readable medium. Various disclosed embodiments may improve graphics performance and/or reduce power consumption, relative to traditional techniques.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Texture Processing Unit

FIG. 2 is a block diagram showing an exemplary texture processing unit 165, according to some embodiments. In the illustrated embodiment, TPU 165 includes input and output interfaces 210A and 210B for communicating with programmable shader 160, state cache 220, router 230, low-level texture cache 235, upper pipeline portions 240A-240N, lower pipeline portions 250A-250N, storage elements 260A-26-N, and de-serializer 270. In some embodiments, TPU 165 is configured to process nearby pixels serially, which may reduce redundant texel fetching and avoid processing invalid pixels, relative to parallel processing.

In the illustrated embodiment, input interface 210A is configured to provide texture state information and pixel coordinates to TPU 165. The texture state information may indicate base address of a texture, texture size, clamping parameters, filtering parameters, etc. State cache 220, in the illustrated embodiment, is configured to cache texture state information for use in processing multiple different sets of pixels. U.S. patent application Ser. No. 14/482,828 describes non-limiting exemplary embodiments of a texture state cache that may be used to implement cache 220.

Router 230, in the illustrated embodiment, is configured to route quads of pixels for processing by different pipelines. In the illustrated embodiment, router 230 is configured to generate processed coordinates, e.g., based on the state information and input pixel coordinates. In some embodiments, router 230 is configured to determine one or more sample locations for each pixel (e.g., based on the filtering mode) and indicate these locations using the processed coordinates. In some embodiments, router 230 is configured to attempt to send adjacent quads to the same pipeline, which may improve cache performance for various processing loads.

Upper pipelines 240, in the illustrated embodiment, are configured to serialize pixels early in the pipeline and process pixels serially subsequent to serialization. In the illustrated embodiment, upper pipelines 240 are configured to send requests for texture data to low-level texture cache 235. In some embodiments, interface 210A is configured to provide data for a quad of pixels in each clock cycle (although various widths and/or numbers of interfaces may be implemented in other embodiments). The cache requests may specify addresses that are determined based on one or more sample coordinates for each pixel. In some embodiments, upper pipelines 240 are configured to check whether any coordinates for cache requests for a given pixel are the same as the previous pixel in the serialization order. If a texel coordinate overlaps with the previous pixel, an upper pipeline 240 is configured to mark the texel as overlapping and does not process that texel (e.g., does not send a cache request, which may also avoid duplicating computation such as decompression or de-gamma for retrieved texels).

In some embodiments, upper pipelines 240 are configured not to process invalid pixels (e.g., pixels that fall outside a polygon). For example, upper pipelines 240 may not make cache requests for these pixels or forward these pixels to lower pipelines 250. This may reduce complexity and power consumption relative to parallel processing, in which a pipeline are sized to handle a quad of data even if some of the pixels are invalid.

Lower pipelines 250, in the illustrated embodiment, are configured to process pixels serially. Lower pipelines 250 may each include a plurality of pipeline stages. Note that the serial processing may be performed in a pipelined fashion, such that a subsequent pixel enters a pipeline stage in the next cycle after a previous pixel (in other words, serial processing does not imply that all processing is finished for a previous pixel before processing of a subsequent pixel begins).

In the illustrated embodiment, each lower pipeline 250 includes a storage element 260 that is configured to store texel data. Although storage elements 260 are shown at the end of the lower pipelines, these elements may be included in any of various appropriate pipeline stages in other embodiments. In some embodiments, texel data for a processed pixel is stored in a storage element 260 and made available to one or more subsequent pixels, as discussed in further detail below. This may allow overlapping texels to be retrieved and processed once, but used for multiple pixels that are processed consecutively.

De-serializer 270, in the illustrated embodiment, is configured to parallelize the output of the serial pixel processing and provide quad data to programmable shader 160 via output interface 210B.

Exemplary Pipeline Texel Storage Techniques

In some embodiments, use of storage elements 260 reduces texel retrieval requirements in cases where there are overlapping texels (texels that are used for samples for multiple different pixels in a quad). In some embodiments, a lower pipeline 250 is configured to process a subsequently-processed pixel (that uses an overlapping texel with a previously-processed pixel) without retrieving texel data for the overlapping texel from low-level texture cache 234 for the subsequently-processed pixel (rather, the texel data may be stored in a storage element 260). This may reduce power consumption by reducing duplicate retrievals and/or processing of texel data, in various embodiments. Depending on the number of texels stored in storage elements 260, a given overlapping texel may be retrieved only once for a given quad of pixels.

Storage elements 260, may be sized to store texel data at different granularities in different embodiments, e.g., texel data for a single sample operation, texel data for pixel, or texel data for a set (e.g., quad) of pixels, in various embodiments. In some embodiments, storing texel data for a single sample operation for each texel lane in each storage element 260 may provide overall reductions in power consumption and/or may increase performance, especially relative to parallel texture processing for pixels in a quad. This may correspond to storing texel data for a single pixel in each storage element 260 (which may include texel data for multiple samples, e.g., four, for each pixel).

Exemplary Pixel Ordering Techniques

Figure 3:
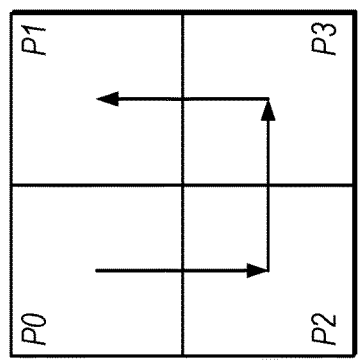
FIG. 3 is a diagram illustrating exemplary orderings for processing pixels serially to potentially increase texel overlap, according to some embodiments.
Figure 3:
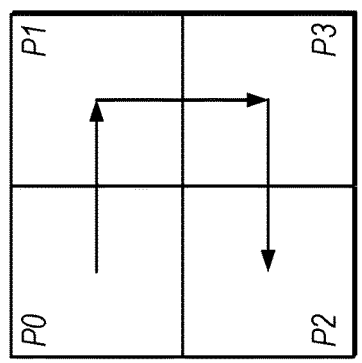
Figure 3:
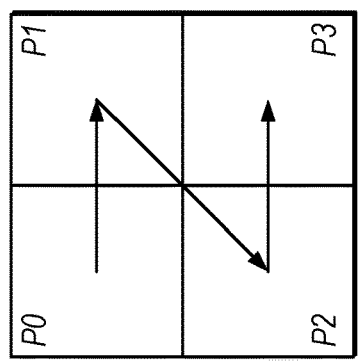

In some embodiments, upper pipelines 240 are configured to serialize pixels for processing in a particular order, e.g., to increase texel overlap. FIG. 3 is a diagram illustrating a set of pixels P0-P3 in a quad (shown oriented in screen space) and three non-limiting examples of orderings for serially processing these pixels.

In ordering A, pixel 0 is processed first, then P1, then P2, then P3. In ordering B, pixel P0 is processed first, then P1, then P3, then P2. In ordering C, pixel P0 is processed first, then P2, then P3, then P1. In various embodiments, orderings B and C may result in a greater amount of pixel overlap, relative to ordering A. For example, P1 and P2 may have less overlap than adjacent pixels, so ordering A may have roughly ⅔rds the amount of texel overlap, on average, of orderings B and C. Therefore, in various embodiments, TPU 165 is configured to select a pixel ordering with a greater likelihood of texel overlap, relative to other ordering options.

In some embodiments, TPU 165 is configured to select a pixel ordering based on a filtering mode. Examples of filtering modes include, without limitation: nearest neighbor, bilinear, bi-cubic, trilinear, anisotropic, etc. As one particular example, in some embodiments, TPU 165 is configured to use ordering B for anisotropic filtering where the major axis is horizontal and ordering C for anisotropic filtering where the major axis is vertical.

The term "anisotropic filtering" is intended to be construed according to its well understood meaning in the art, which includes filtering that is performed differently in different directions, e.g., to improve the image quality of rendering when textures are at oblique viewing angles. In some implementations, this is performed by taking a sequence of samples, for each pixel, along the major axis, and determining attributes for the pixel based on those samples. The "major axis" refers to the direction in which the change in texture-space is greatest between texels when mapped to screen space. For example, for a texture being used to show a road going directly away from the camera into the distance, the major axis is vertical. Note that the major axis may be vertical, horizontal, or one of two diagonals. As used herein, the terms "horizontal" major axis and "vertical" major axis refer to situations where the major axis is closer to horizontal or vertical, respectively, than to one of the diagonal situations. For example, a horizontal major axis may not be precisely horizontal, but includes vectors from −22.5 degrees to 22.5 degrees and 157.5 degrees to 202.5 degrees (where zero degrees refers to a vector pointing directly to the right in screen space). Graphics hardware may or may not be able to classify the major axis this precisely, but is configured to classify the major access into one of horizontal, vertical, or one of two diagonals, in some embodiments.

In some embodiments, texel overlap is more likely between horizontally adjacent pixels when the major axis is horizontal and between vertically adjacent pixels when the major axis is vertical. Therefore, using ordering B for horizontal major situations may have two transitions between pixels (0 to 1 and 3 to 2) where there is a high likelihood of overlap (sequence A also has two such transitions, but may decrease the likelihood of overlap on the second step of the sequence, relative to sequence B). Similarly, using ordering C for vertical major situations may have two transitions between pixels (0 to 2 and 3 to 1) where there is a high likelihood of overlap.

Figure 4A:
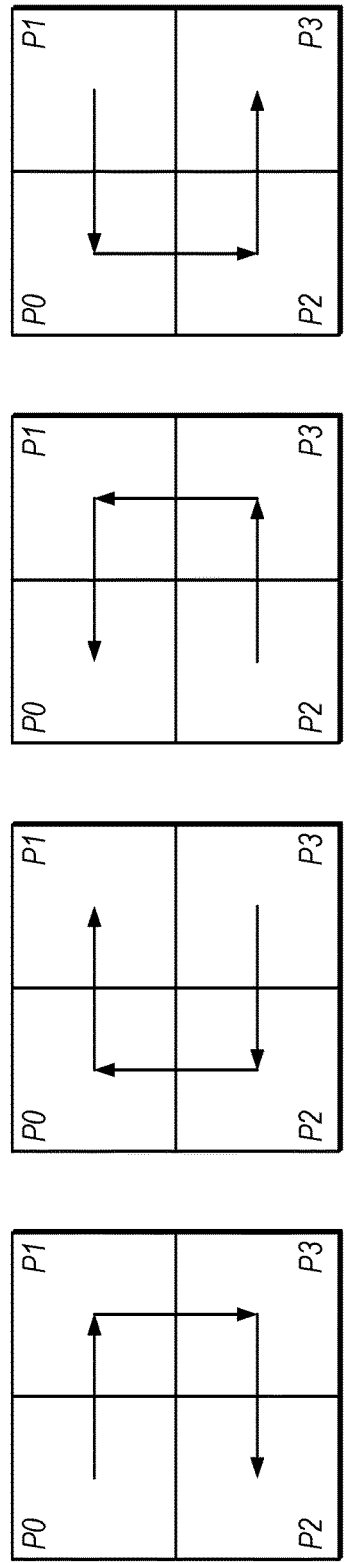
FIGS. 4A-4B are diagrams illustrating exemplary pixel processing orders based on anisotropic filtering major axis direction, according to some embodiments.
Figure 4B:
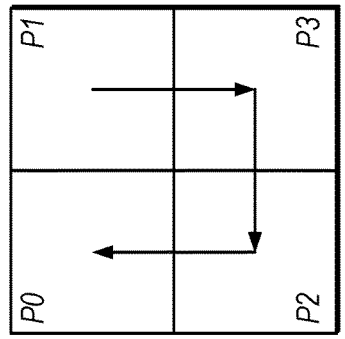
Figure 4B:
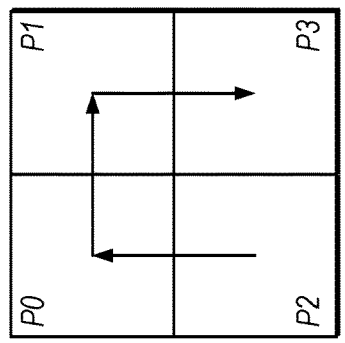
Figure 4B:
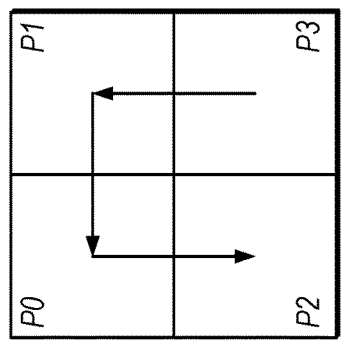
Figure 4B:
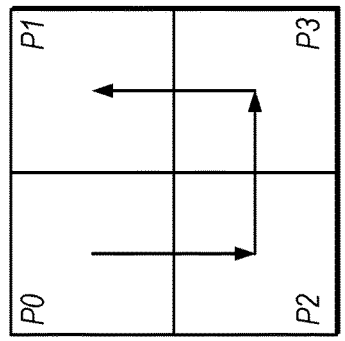

FIG. 4A is a diagram illustrating exemplary orderings for processing pixels in series for a horizontal anisotropic major vector, according to some embodiments. FIG. 4B is a similar diagram for a vertical anisotropic major vector, according to some embodiments. As shown, the illustrated orderings have more transitions between pixels in a quad in the direction of the major axis (two transitions for each quad) than transitions in the perpendicular direction (one transition for each quad). Therefore, in some embodiments, TPU 165 is configured to select one of the orderings of FIG. 4A when the anisotropic major axis is horizontal and configured to select one of the orderings of FIG. 4B when the anisotropic major axis is vertical.

Exemplary Orderings Among Different Sets of Pixels

In some embodiments, router 230 is configured to order sets of pixels (e.g., quads) that it sends to a particular pipeline. For example, using the pixel processing sequence B of FIG. 3, it may be advantageous to process a quad that is to the left or below the current quad in screen space (e.g., to potentially increase overlap and improve memory locality, given that the lower left pixel in the quad is processed last).

Alternatively, In some embodiments, TPU 165 is configured to use different serial orderings for processing pixels of adjacent different quads in order to increase overlap between pixels in different quads (e.g., the last processed pixel of one quad and the first processed pixel of a subsequent quad, which may be processed using consecutive stages of a pipeline 250).

Figure 5:
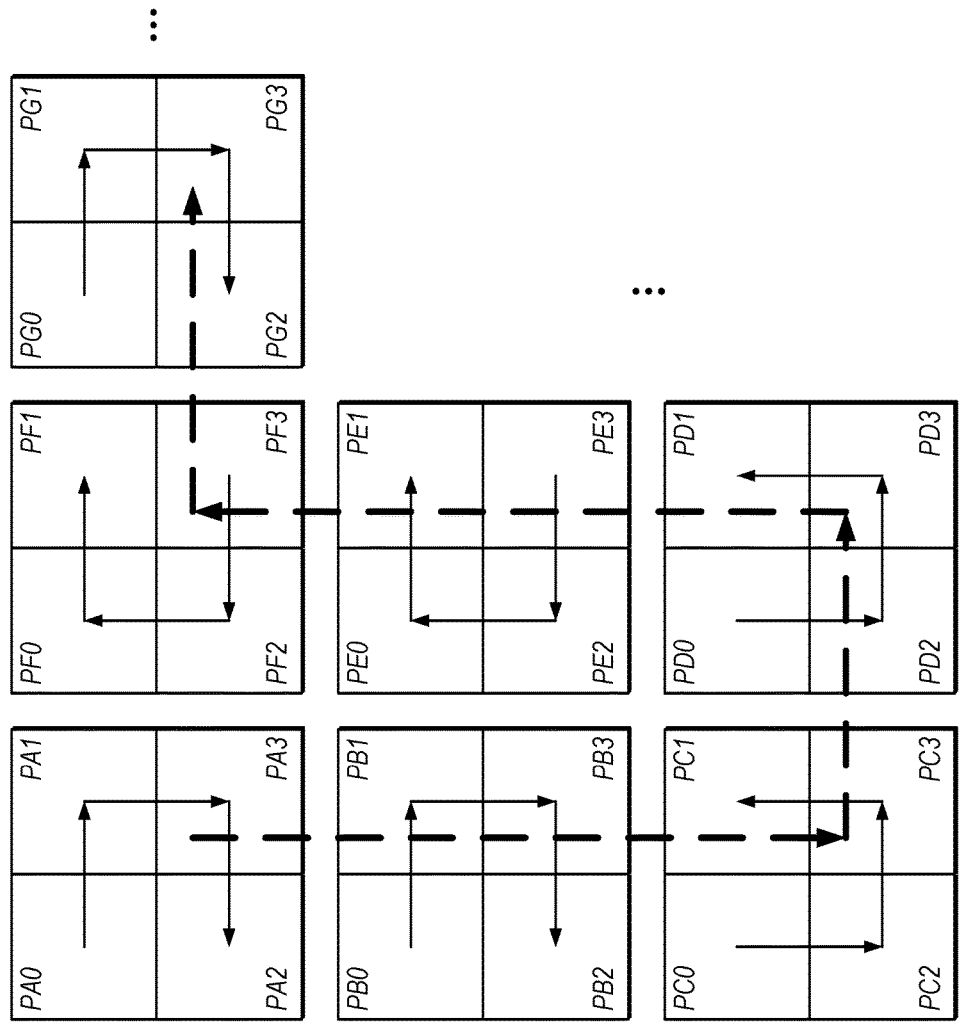
FIG. 5 is a diagram illustrating a diagram illustrating exemplary pixel processing order adjustments for adjacent quads of pixels.

FIG. 5 is a diagram illustrating exemplary orderings for different quads in a screen space, according to some embodiments. In the illustrated example, five quads A-G are shown.

The bold dashed line represents the ordering of processing quads, according to some embodiments. Therefore, in the illustrated embodiment, quad A is processed, then quad B, then quad C, etc. The quads may be processed in a pipelined fashion by the same processing pipeline. The notation Pxy reference to pixel y in quad x.

As shown, different orderings of pixels are used for ones of the different quads. For example, the ordering for quad C is different than for quad B in order to increase the potential for overlap with a pixel from quad D (between pixels PC1 and PD0 in the illustrated embodiments). Similarly, the ordering for quad E is different than for quad D in order to increase the potential for overlap between pixels PD1 and PE3. Therefore, in various embodiments, TPU 165 is configured to select an ordering of serial pixel processing for consecutively processed quads such that the last pixel of the earlier quad and the first pixel of the subsequent quad are adjacent in screen space.

In some embodiments, router 230 is configured to output samples for pixels according to the selected ordering, which may improve memory locality for texture accesses given that nearby texels are often stored near each other.

Although anisotropic filtering is discussed herein for purposes of illustration, it is not intended to limit the scope of the present disclosure. Rather, the disclosed techniques for using different pixel processing orders based on filtering mode may be implemented for any of various appropriate filtering modes.

Exemplary Methods

FIG. 6 is a flow diagram illustrating a method 600 for serial texture processing, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a texture processing pipeline receives, in parallel, pixel information for a set of pixels. For example, programmable shader 160 may send this parallel data via interface 210A. Speaking generally, quads of pixel data may be processed in parallel by programmable shader 160 and processed serially in at least a portion of TPU 165.

At 620, in the illustrated embodiment, the texture processing pipeline operates serially on the set of pixels. For example, an upper pipeline 240 may serialize pixel data for a quad of pixels. For a quad of pixels, for example, a given stage of the texture processing pipeline may process a first pixel in a first cycle, then a second pixel in a second cycle that follows the first cycle, then a third pixel in a third cycle that follows the second cycle, then a fourth pixel in a fourth cycle that follows the third cycle. Thus, for a given operation performed by a given stage, the operation is performed serially for pixels in the set of pixels rather than in parallel in the same clock cycle.

At 630, in the illustrated embodiment, the texture processing pipeline (e.g., using sample circuitry in upper pipeline 240) retrieves texel data from a texture storage element (e.g., a texture cache) for a pixel of the set of pixels. Note that the texture storage element may or may not be configured to store complete textures, e.g., it may cache a portion of a texture at a time.

At 640, in the illustrated embodiment, the texel data is stored at a stage of the texture processing pipeline. The stage may be a stage in which the texel data is used for filtering.

At 650, in the illustrated embodiment, the stored texel data is used for a subsequently-processed pixel in the set of pixels without accessing the texture storage element to retrieve the stored texel data for the subsequently-processed pixel. This may reduce power consumption and/or improve performance, relative to fetching the overlapping texel for each pixel that uses the texel. As discussed above, this may eliminate a substantial portion of processing texel data for overlapping texels, including reduction in retrieving the texel data, decompression, degamma, color-space conversion, depth comparison, etc.

FIG. 7 is a flow diagram illustrating a method 700 for determining anisotropic sample ordering, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, texture sampling circuitry retrieves texel data (e.g., from cache 235) for pixels to be processed for display. The texel data may be used to determine pixel attributes according to various filtering modes, including without limitation: nearest neighbor, bilinear, trilinear, bi-cubic, anisotropic, etc.

At 720, in the illustrated embodiment, a processing pipeline processes pixels based on the retrieved texels, including processing a set of pixel serially where ones of the pixels are adjacent pixels (e.g., a quad of pixels). The serial processing may be performed in a pipelined manner.

At 730, in the illustrated embodiment, the graphics unit selects an ordering in which to serially process the set of pixels based on a filtering mode for processing the set of pixels. For example, for anisotropic filtering modes, the graphics unit may select the ordering based on the direction of the major vector. The ordering may be selected to increase the consecutive processing of pixels that are adjacent in the direction of the major vector, relative to other orderings.

Exemplary Device

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 150, and display unit 865. In some embodiments, device 800 may include other components (not shown) in addition to and/or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 1045 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

In some embodiments, various elements of device 800 may include clock gaters arranged hierarchically, including various series of DET clock gaters coupled to deliver clock signals to different portions of a clock tree. The disclosed techniques may reduce switching power consumption in device 800, balance the clock delay to different portions of device 800, reduce errors in device 800, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 9 is a block diagram illustrating an exemplary non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable medium 910, may comprise any of various appropriate types of memory devices or storage devices. Medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 910 may include other types of non-transitory memory as well or combinations thereof. Medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabrication at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIG. 1B, 2, or 8. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   texture sample circuitry configured to retrieve texel data from a texture storage element for use in processing pixels in a frame of graphics data;
   a processing pipeline configured to:
      operate on a set of pixels, wherein information for the set of pixels is received by the processing pipeline in parallel, wherein the pipeline is configured to serially process the set of pixels such that data for different ones of the pixels in the set is processed in different pipeline stages of the pipeline during one or more clock cycles; and
      store texel information retrieved by the texture sampling circuitry from the texture storage element for a particular pixel at a stage of the processing pipeline, such that the stored texel information is available to process a subsequently processed pixel at the stage without accessing the texture storage element to retrieve the stored texel data for the subsequent pixel.

2. The apparatus of claim 1, wherein the apparatus is configured to operate serially on the set of pixels in an order such that pixels in the set of pixels that are processed consecutively in the processing pipeline are adjacent in screen space.

3. The apparatus of claim 1, wherein the apparatus is configured to select an ordering in which to serially operate on pixels in the set of pixels based on a texture filtering mode.

4. The apparatus of claim 1, wherein the texel information is stored subsequent to one or more processing steps of: decompression, de-gamma, color-space conversion, or depth comparison operations and wherein the stored texel information is available to process the subsequently processed pixel without re-performing the one or more processing steps.

5. The apparatus of claim 1, further comprising a de-serializer unit configured to provide, in parallel, output data from operating on the set of pixels in series.

6. The apparatus of claim 1, further comprising:
a plurality of additional processing pipelines; and
a routing unit configured to send sets of pixels that are adjacent in screen space to the same processing pipeline.

7. The apparatus of claim 6, wherein the routing unit is configured to send sets of pixels in a particular order such that two or more adjacent pixels in screen space that are in different sets of pixels are processed consecutively, wherein the pixels in each of the different sets of pixels are received in parallel.

8. The apparatus of claim 1, wherein the stage of the processing pipeline is configured to store texel information for one or more samples for a single pixel.

9. A non-transitory computer readable storage medium having stored thereon design information that specifies a design of at least a portion of a hardware integrated circuit in a format recognized by a semiconductor fabrication system that is configured to use the design information to produce the circuit according to the design, including:
texture sample circuitry configured to retrieve texel data from a texture storage element for use in processing pixels in a frame of graphics data;
a processing pipeline configured to:
operate on a set of pixels, wherein information for the set of pixels is received by the processing pipeline in parallel, wherein the pipeline is configured to process the set of pixels serially such that data for different ones of the pixels in the set is processed in different pipeline stages of the pipeline during one or more clock cycles; and
store texel information retrieved by the texture sampling circuitry from the texture storage element for a particular pixel at a stage of the processing pipeline, such that the stored texel information is available to process a subsequently processed pixel at the stage without accessing the texture storage element to retrieve the stored texel data for the subsequent pixel.

10. The non-transitory computer readable storage medium of claim 9, wherein the design information further specifies that the circuit is configured to operate serially on the set of pixels in an order such that pixels in the set of pixels that are processed consecutively in the processing pipeline are adjacent in screen space.

11. The non-transitory computer readable storage medium of claim 9, wherein the design information further specifies that the circuit is configured to select a first ordering in which to serially operate on pixels in a first set of pixels in response to operating in a first texture filtering mode and configure select a second ordering in which to serially operate on pixels in a second set of pixels in response to operating in a second, different texture filtering mode.

12. The non-transitory computer readable storage medium of claim 9, wherein the circuit further comprises a de-serializer unit configured to provide, in parallel, output data from operating on the set of pixels in series.

13. The non-transitory computer readable storage medium of claim 9, wherein the circuit further comprises:
a plurality of additional processing pipelines; and
a routing unit configured to send one or more sets of pixels that are adjacent in screen space to the same processing pipeline.

14. The non-transitory computer readable storage medium of claim 13, wherein the routing unit is configured to send sets of pixels in a particular order such that two or more adjacent pixels in screen space that are in different sets of pixels are processed consecutively, wherein the pixels in each of the different sets of pixels are received in parallel.

15. A method, comprising:
receiving by a texture processing pipeline, pixel information for a set of pixels in parallel;
operating serially, by the texture processing pipeline, on the set of pixels, such that data for different ones of the pixels in the set is processed in different pipeline stages of the pipeline during one or more clock cycles;
retrieving texel data from a texture storage element for a pixel of the set of pixels;
storing the texel data at a stage of the texture processing pipeline; and
using, by the texture processing pipeline, the stored texel data for a subsequently-processed pixel in the set of pixels without accessing the texture storage element to retrieve the stored texel data for the subsequently-processed pixel.

16. The method of claim 15, wherein the operating uses an order such that pixels in the set of pixels that are processed consecutively in the texture processing pipeline are adjacent in screen space.

17. The method of claim 15, further comprising selecting an ordering in which to serially operate on pixels in the set of pixels based on a texture filtering mode.

18. The method of claim 15, further comprising providing output data, in parallel for the set of pixels, from operating on the set of pixels in series.

19. The method of claim 15, further comprising selecting sets of pixels for dispatch to the processing pipeline from among a plurality of available processing pipelines, wherein the selecting sends sets of pixels that are adjacent in screen space to the same processing pipeline.

20. The method of claim 15, further comprising using different serial pixel orderings for different first and second sets of pixels that are sent to the same processing pipeline, thereby causing consecutive processing of one or more sets of adjacent pixels from the first and second sets of pixels.

* * * * *